United States Patent [19]
McWhorter

[11] 3,831,453
[45] Aug. 27, 1974

[54] URINE METER AND COLLECTION RECEPTACLE

[75] Inventor: Daniel M. McWhorter, Arlington Heights, Ill.

[73] Assignee: The Kendall Company, Boston, Mass.

[22] Filed: Feb. 10, 1972

[21] Appl. No.: 225,051

[52] U.S. Cl. .................. 73/427, 128/2 F, 128/275
[51] Int. Cl. .............................................. A61f 5/44
[58] Field of Search....... 73/427; 128/2 F, 276, 275, 128/295, DIG. 24

[56] References Cited
UNITED STATES PATENTS

| | | | |
|---|---|---|---|
| 2,789,728 | 4/1957 | Britton | 128/DIG. 24 |
| 2,800,269 | 7/1957 | Smith | 128/DIG. 24 |
| 2,936,757 | 5/1960 | Trace | 128/276 |
| 3,131,812 | 5/1964 | Constant | 128/DIG. 24 |
| 3,194,069 | 7/1965 | Scott | 128/2 F X |
| 3,345,980 | 10/1967 | Coanda | 128/2 F |
| 3,534,738 | 10/1970 | Huck | 128/275 |
| 3,559,647 | 2/1971 | Bidwell | 128/276 |
| 3,568,965 | 3/1971 | Clark | 128/275 X |
| 3,650,272 | 3/1972 | Ericson | 128/275 |
| 3,661,143 | 5/1972 | Henkin | 128/275 X |

Primary Examiner—Richard C. Queisser
Assistant Examiner—Daniel M. Yasich

[57] ABSTRACT

A combination urine meter and collection receptacle for measurement of liquid urine volume formed from a pair of plastic sheet panels, preferably flexible at least in part, closed along their peripheries, and having dividing wall means therein defining a lower volume first compartment and a higher volume second compartment. An inlet is provided into the first compartment, wherein liquid urine introduced thereinto may be measured by suitable indicia and thereafter transferred to the higher volume second compartment for collection. Overflow protection is also provided for the lower volume first compartment.

3 Claims, 4 Drawing Figures

URINE METER AND COLLECTION RECEPTACLE

This invention relates to a combination liquid urine meter and collection receptacle for measurement of liquid volume.

Frequently, it is desirable to measure urine output from a patient for a given time period, as well as to collect it, particularly with critically ill patients and following surgery, and to do so in a convenient and sanitary manner. To this end, in recent years, disposable plastic bags have been widely used, and have proved to be quite satisfactory insofar as is concerned the convenient and sanitary collection of urine. However, since they must be large enough to hold a reasonably high volume of liquid, they are not capable of accurate measurement of small volumes, and, in particular, are not capable of successive measurement of small volumes.

Accordingly, it is a major object of the present invention to provide a liquid urine meter and collection receptacle not only capable of collecting a large volume of liquid urine from a patient, but also capable of accurate measurement of successive small volumes of liquid urine without emptying the contents of the container.

In general, this is accomplished by providing a container formed from a pair of plastic sheet panels, preferably flexible at least in part, closed along their peripheries, and having dividing wall means therein defining a lower volume first compartment and a higher volume second compartment. An inlet is provided into the first compartment, wherein liquid urine introduced thereinto may be measured by suitable indicia and thereafter transferred to the higher volume second compartment for collection. Venting and overflow protection are also preferably provided for the lower volume first compartment.

For the purpose of more fully explaining further objects and features of the invention, reference is now made to the following detailed description of preferred embodiments thereof, together with the accompanying drawings wherein.

Figure 1:
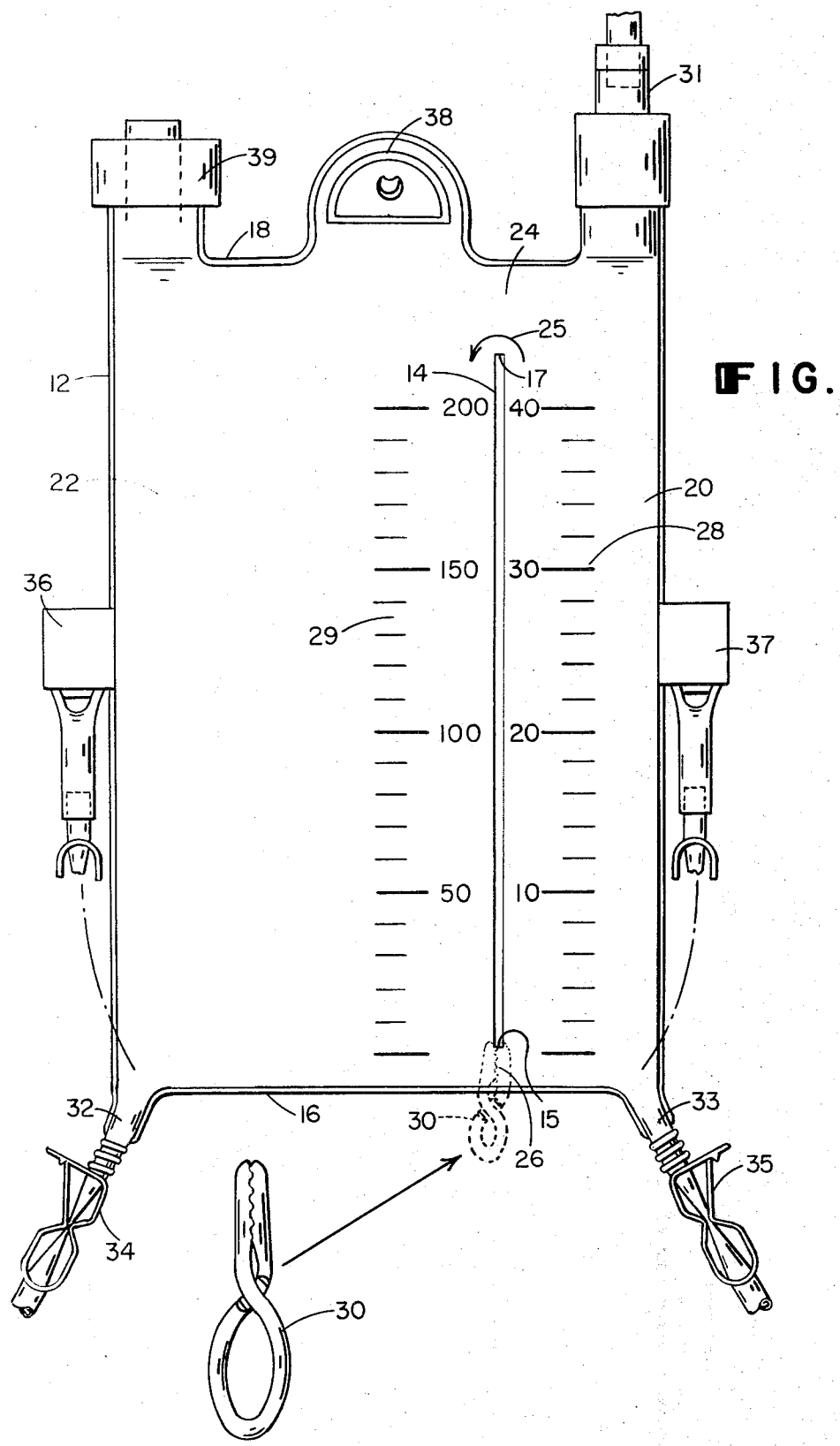
FIG. 1 is a side view of a first preferred embodiment of the urine meter and collection receptacle of the invention.

The liquid urine meter and collection receptacle as shown in FIG. 1 comprises a pair of flexible plastic sheet panels 12, the front one of which is preferably translucent, closed along their peripheries as by heat sealing to form a bag. According to the invention, panels 12 are internally connected by heat sealing them, forming a dividing wall 14 extending from a point 15 closely spaced from the lower end 16 of said bag to a point 17 closely spaced from the upper end 18 of said bag, defining a lower volume first compartment 20 and a higher volume second compartment 22. An upper fluid communication channel 24 extends between said compartments at the upper end of the bag and a lower liquid communication channel 26 extends between said compartments at the lower end of the bag. Liquid calibration indicia in the form of a scale 28 are provided on said lower volume first compartment 20 and a similar scale 29 is provided on the higher volume second compartment 22. A selectively operable closure in the form of a clamp 30 is provided for said lower liquid communication channel 26 and is shown in position thereon in dotted lines for clarity.

A liquid inlet 31 is provided in the upper end of said bag above and in communication with lower volume first compartment 20 so liquid urine from inlet 31 will pass directly into said lower volume compartment. Liquid outlet tubes 32, 33 closable by clamps 34, 35 are preferably provided in the lower end of the container in communication with the higher and lower volume compartments, respectively. Supporting clips 36, 37 may also be provided for the ends of outlet tubes 32, 33. A suitable hanger 38 may also be provided, as well as an air vent valve 39 at the top of the bag.

In operation, with clamp 30 closed, liquid entering through inlet 31 passes directly into lower volume compartment 20 for measurement thereof by scale 28. It may be drawn off through outlet tube 33 if so desired for analysis. At desired intervals, the lower volume compartment may be emptied into higher volume compartment 22 by releasing clamp 30 and tilting the bag slightly to empty compartment 20, after which clamp 30 is reinstalled for another measurement. Upper fluid communication channel 24 provides both air venting and overflow liquid passage from said lower volume first compartment to said higher volume second compartment, such overflow moving in the direction of arrow 25, should the lower volume compartment become overfilled. The higher volume compartment may be drained through outlet tube 32. Air venting is provided through vent valve 39.

Figure 3:
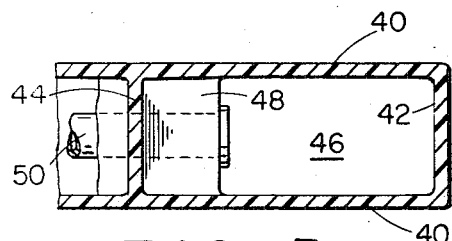
FIGS. 2 and 3 are, respectively, a partial side view and cross section of a second preferred embodiment of the invention.
Figure 2:
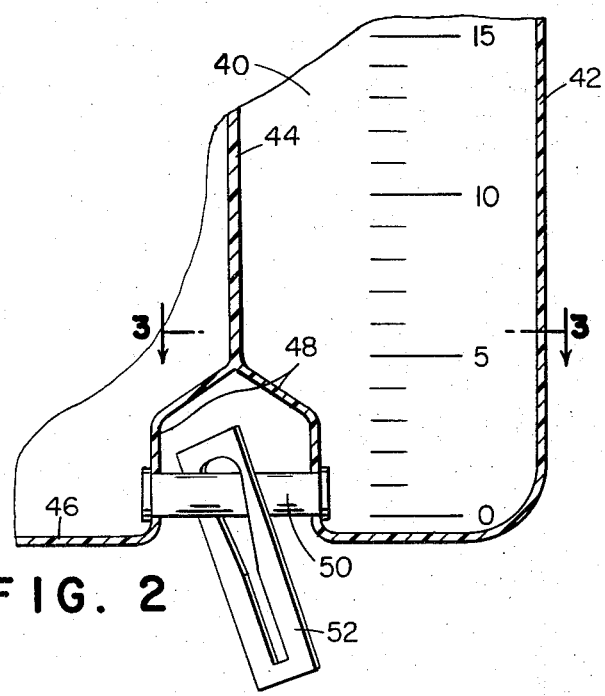

FIGS. 2 and 3 illustrate a somewhat modified construction of the urine meter and collection receptacle of the invention of rigid rather than flexible plastic to provide a more accurate volumetric measurement in the lower volume compartment. Specifically, rigid plastic parallel side walls 40 are provided spaced from one another with a vertical end wall 42 and a dividing wall 44 extending therebetween, as well as a bottom wall 46 having an upwardly extending recess therein, the walls 48 of which are joined to the bottom of dividing wall 44. A flexible tube 50 extends between recess walls 48 to provide liquid communication between the compartments. A sliding clamp 52, shown in open position, is mounted on tube 50 to close it.

The operation of the device of FIGS. 2 and 3 is similar to that of FIG. 1.

Figure 4:
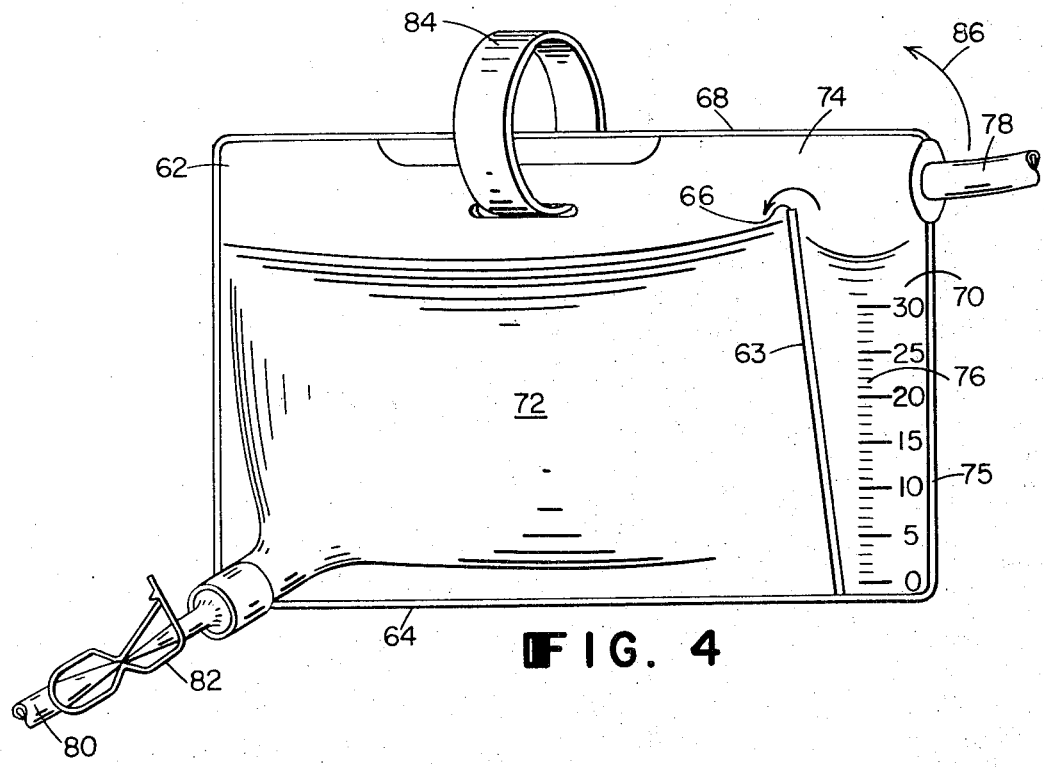
FIG. 4 is a side view of a third embodiment of the invention.

FIG. 4 illustrates a urine meter and collection receptacle of the invention somewhat similar to that of FIG. 1 but of a more transversely elongated form in which the lower liquid communication channel and its closure are eliminated. Thus, a pair of plastic sheet panels 62, one of which is preferably translucent, are provided closed along their peripheries to form a bag. Panels 62 are internally connected by heat sealing them, forming a dividing wall 63 along a line extending from the lower end 64 of the bag to a point 66 closely spaced from the upper end 68 of the bag, defining a lower volume first compartment 70 and a higher volume second compartment 72 with an upper fluid communication channel 74 extending therebetween. Dividing wall 63 slopes upwardly away from its opposite side wall 75 of lower volume compartment 70 to provide a more accurate expanded reading of low volumes.

As before, a liquid calibration scale 76 is provided on the lower volume compartment 70, and a liquid inlet 78 is provided in the upper end of the bag above and in communication with the lower volume compartment 70. A liquid outlet tube 80, closable by a clamp 82, is also provided in the lower end of the container in communication with the higher volume second compartment 72. A hanger 84 may also be provided on the top side of the bag.

In operation, liquid entering through inlet 78 passes directly into lower volume compartment 70 for measurement thereof by scale 76. At desired intervals, said compartment may be emptied into larger volume compartment 72 by tilting the bag about 90 degrees counterclockwise as shown by arrow 86 in FIG. 4 to empty lower volume compartment 70 into higher volume compartment 72, after which the bag is returned to its original position for another measurement.

What is claimed is:

1. A liquid urine meter and collection receptacle comprising
   a pair of plastic sheet panels closed along their peripheries to form a container
   dividing wall means in said container extending from adjacent the lower end thereof to adjacent the upper end thereof defining a lower volume first compartment and a higher volume second compartment
   liquid calibration indicia for said lower volume first compartment
   lower liquid communication means extending between said compartments adjacent the lower end of said container
   selectively operable closure means for said lower liquid communication means for holding the liquid in the lower volume compartment for measuring the volume therein and for emptying the liquid therefrom into the higher volume compartment and
   liquid inlet means in the upper end of said container adjacent said lower volume first compartment and communicating therewith for introducing a liquid thereinto while said closure means is closed for indication of its volume by said calibration indicia.

2. A liquid urine meter and collection receptacle comprising
   a pair of flexible plastic sheet panels closed along their peripheries to form a bag
   said panels being internally connected along a line extending from a point closely spaced from the lower end of said bag to a point closely spaced from the upper end of said bag defining a lower volume first compartment and a higher volume second compartment, with fluid communication channels extending between said compartments at the upper and lower ends of said bag
   liquid calibration indicia on each of said compartments
   selectively operable closure means for the lower of said communication channels for holding the liquid in the lower volume compartment for measuring the volume therein and for emptying the liquid therefrom into the higher volume compartment
   liquid inlet means in the upper end of said bag communicating with said lower volume first compartment for indication of its volume by said calibration indicia while said closure means is closed, said upper liquid communication channel providing an overflow liquid passage from said lower volume first compartment to said higher volume second compartment and
   selectively operable liquid outlet means in the lower end of said bag communicating with each said compartments for selectively removing liquid therefrom.

3. A liquid urine meter and collection receptacle comprising
   a pair of plastic sheet panels closed along their peripheries to form a container
   dividing wall means in said container extending from adjacent the lower end thereof to adjacent the upper end thereof defining a lower volume first compartment and a higher volume second compartment
   liquid calibration indicia for said lower volume first compartment
   upper fluid overflow communication means extending between said compartments adjacent the upper end of said container and
   liquid inlet means in the upper end of said container adjacent said lower volume first compartment and communicating therewith for introducing a liquid thereinto for indication of its volume by said calibration indicia, said upper fluid communication means providing an overflow liquid passage from said lower volume first compartment to said higher volume second compartment
   lower liquid communication means extending between said compartments adjacent the lower end of said container and
   selectively operable closure means for said lower liquid commmunication means
   said closure means being closed for indication of the volume of said liquid in the lower volume compartment and adapted to be opened to empty the liquid therein into the higher volume compartment.

* * * * *